United States Patent Office 2,816,110
Patented Dec. 10, 1957

2,816,110
METHODS FOR THE PRODUCTION OF SUBSTITUTED PTERIDINES

Meyer Sletzinger and Donald F. Reinhold, North Plainfield, N. J., assignors to Merck & Co., Inc., Rahway, N. J., a corporation of New Jersey No Drawing. Application November 23, 1956,
Serial No. 623,782
18 Claims. (Cl. 260—251.5)

This invention relates to methods useful in the production of substituted pteridines. Specifically, it is concerned with novel processes for the condensation of pteridine aldehydes with para-aminobenzoic acid and derivatives thereof to produce substituted pteridines, and for the reduction of imines of pteroic acid and esters and amido derivatives thereof to the corresponding amines.

This application is a continuation-in-part of our co-pending applications Serial Nos. 387,544 and 387,545, filed October 21, 1953 both now abandoned.

The presently available processes for the production of substituted pteridines, such as pteroylglutamic acid (folic acid) and the like, are difficult to carry out and generally result in poor yields of the desired product.

It is therefore an object of this invention to provide processes for the production of substituted pteridines. Another object is to provide a new method of effecting the condensation of pteridine aldehydes with para-aminobenzoic acid and derivatives thereof to produce substituted pteridines. A further object is to provide improved methods for the reduction of imines of pteroic acid, its esters and amido derivatives to the corresponding amines. An additional object is to provide a highly practical process for the production of folic acid and its $N^2$ acyl derivatives. Other objects will be apparent from the detailed description of the invention hereinafter provided.

In accordance with the present invention, it is now found that pteridines having a formyl substituent can be condensed with aromatic amines in the presence of a compound containing a sulfhydryl group to produce the corresponding substituted pteridine compound. This reaction may be illustrated as follows:

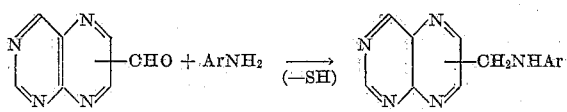

wherein Ar represents an aromatic radical which may be substituted or unsubstituted. This method of condensing pteridine aldehydes with aromatic amines provides a convenient and practical method of preparing substituted pteridines.

Thus, pursuant to a preferred embodiment of this invention, valuable substituted pteroic acid compounds and derivatives thereof such as folic acid and the like can be readily prepared in accordance with the following reaction:

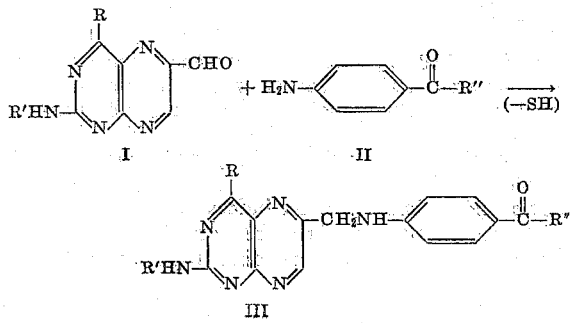

wherein R is a hydroxy group or group convertible to hydroxy by hydrolysis such as an alkoxy, aryloxy or aralkoxy group, R' is hydrogen or an acyl group and R" is a hydroxy, alkoxy, aryloxy, aralkoxy, amino or substituted amino group.

These substituted pteridines are conveniently produced according to this invention by contacting a pteridine aldehyde and aromatic amine in the presence of a suitable compound having a sulfhydryl group. Some of the sulfhydryl compounds that are particularly useful in effecting this reaction are thiocresol, thiophenol, thiourea, thioacetic acid, thioglycolic acid, hydrogen sulfide, benzylmercaptan, β-thionaphthol and tertiary butylmercaptan.

As has been briefly indicated above, aromatic amines and particularly para-aminobenzoic acid and derivatives thereof such as esters and amides may be condensed with pteridine aldehydes in the presence of a sulfhydryl compound to produce the desired pteridine derivatives. For example, alkyl, aryl, and aralkyl esters such as the methyl, ethyl, propyl, butyl, phenyl and benzyl esters of para-aminobenzoic acid and amides such as para-aminobenzamide and similar amides derived from para-aminobenzoic acid and amino acids such as glutamic acid, glycin, aspartic acid, leucine, alanine and cysteine may be used as reactants in this process.

The pteridine aldehydes suitable for use as reactants in this process may have the aldehyde group in any desirable nuclear position. This process, however, is particularly suitable for effecting the condensation of pteridine aldehydes which have an aldehyde group in the 6 position with suitable aromatic amines. In this regard, the condensation of 6-formyl pteridines, and particularly 2-amino or 2-acylamino-6-formyl pteridines having a hydroxy group or its equivalent in the 4 position with an appropriate aromatic amine, results in the formation of products such as pteroic acid, folic acid and similar compounds of established value and great usefulness. Alternative to having a hydroxy group in the 4 position such pteridine aldehydes may have groups at this position which are equivalent to the hydroxy group such as alkoxy, aryloxy and aralkoxy groups and specifically methoxy, ethoxy, propyloxy, phenoxy and benzyloxy groups.

The 2-amino pteridines described above may be conveniently produced by processes described in the literature while the 2-acylamino-6-formyl pteridines such as 2-propionamido-4-hydroxy-6-formyl pteridine, 2-benzamindo-4-hydroxy-6-formyl pteridine, 2-butyramido-4-hydroxy-6-formyl pteridine and 2-phenylacetamido-4-hydroxy-6-formyl pteridine may be conveniently produced according to processes disclosed in United States patent application Serial No. 334,382, now abandoned, and in the co-pending application Serial No. 427,333.

The 2-acylamino pteridines offer many advantages over the non-acylated 2-amino compounds and are therefore preferred for use in this process. Thus one advantage realized when the 2-acylamino pteridines are utilized in this process is the obtainment of essentially pure condensation products directly from the reaction mixture with a minimum of effort. Furthermore, the 2-acylamino pteridines have a solubility considerably greater than that of the 2-amino pteridines and, accordingly, may be employed in this process in greater concentrations than the non-acylated compounds with an appreciable saving of solvent. The acyl amino pteridines wherein the acyl group is a carboxylic acid radical having not more than eight carbon atoms, such as those mentioned above, are particularly useful starting materials in the processes of the present invention.

To effect the process of this invention the pteridine aldehyde and aromatic amine are conveniently contacted with a sulfhydryl compound in the presence of a suitable inert solvent. Among the solvents which may be used for this purpose that can be mentioned are Cellosolve, methyl Cellosolve, butyl Cellosolve, pyridine, acetic acid, dioxane and substituted methylamines.

The condensation begins immediately upon contacting the reactants and sulfhydryl compound in a solvent but nevertheless proceeds slowly at ordinary temperatures. To increase the reaction rate and hasten its completion elevated temperatures of about 100–170° C., and preferably the reflux temperature, may be conveniently used. The time required to complete the reaction will naturally vary somewhat with the reactants and reaction conditions but ordinarily reaction times of 2 to 16 hours are entirely adequate.

In effecting the reaction by the novel methods of this invention various ratios of pteridine aldehyde to aromatic amine can be employed successfully. However, it is considered preferable to employ equimolar amounts of the reactants, or a slight excess of the aromatic amine, such good results are obtained with such quantities. The sulfhydryl compound employed in the condensation is preferably used in excess and to obtain optimum results a 2 to 12 fold molar excess is employed based on the amount of pteridine aldehyde used.

After the reaction has been completed the desired pteridine condensation product is isolated from the reaction mixture by conventional procedures. Thus, the pteridine derivatives which are generally of low solubility in organic solvents are accordingly readily recovered by filtration and purified by washing with solvents such as ether and water. Alternatively, a solvent such as ether or water in which the product is insoluble may be added directly to the reaction mixture to insure complete precipitation of the product.

As is seen from the above description this process may be applied in the production of a large number of valuable substituted pteridines. In particular, this process is considered to be extremely useful in the commercial production of folic acid and its related $N^2$ acylamino derivatives. By this process, the condensation of 2-amino and 2-acylamino-4-hydroxy 6-formyl pteridines with para-aminobenzoylglutamic acid in the presence of a sulfhydryl compound produces folic acid and $N^2$ acyl folic acids in greater yield than has been previously obtained. In addition, the resulting folic acid products are much purer and in crystalline form. Such results are indeed surprising in view of the many difficulties normally encountered in the pteridine art in obtaining essentially pure crystalline compounds.

It has also been discovered according to another embodiment of the present invention that imines of pteroic acid, its esters and amido derivatives of the formula

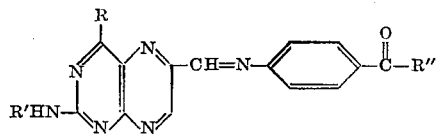

may be reduced to the corresponding 6-pteridylmethylene amines of the formula

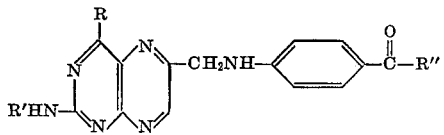

by compounds containing a sulfhydryl group.

In the above formulas R represents a hydroxy group or group convertible to hydroxy by hydrolysis such as an alkoxy, aryloxy, or aralkoxy group, R' is hydrogen or an acyl group and R" is a hydroxy, alkoxy, aryloxy, aralkoxy, amino or substituted amino group.

Thus, R may be groups other than hydroxy such as methoxy, ethoxy, propoxy, butoxy, phenoxy, and benzyl-oxy groups, R' may be hydrogen or acyl groups having not more than eight carbon atoms such as formyl, acetyl, propionyl, butyryl, benzoyl, and phenylacetyl groups and R" may be, in the addition to the hydroxy group, groups such as methoxy, ethoxy, propoxy, phenoxy, and benzyloxy groups, the amino group, and substituted amino groups such as amides derived from glutamic acid, aspartic acid, glycine, alanine and the like.

This reduction is conveniently achieved by contacting the imine and sulfhydryl compound in a suitable solvent which is inert towards the sulfhydryl compound. Some of the solvents which are satisfactory for this purpose are Cellosolve, methyl Cellosolve, butyl Cellosolve, pyridine, tertiary amines, acetic acid, dioxane, substituted methylamines, and ethylene glycol. Although lower temperatures can be used it is preferred to employ elevated temperatures of about 100–170° C. in effecting the reaction. Reflux temperatures may be conveniently employed if desired. The time required to complete the reaction will vary with the reactants, solvent and temperature but ordinarily reaction times of from 2 to 16 hours are sufficient.

An excess of the sulfhydryl compound is generally employed in the reaction and to obtain optimum results a two to twelve fold molar excess if preferably used.

After the reaction has been completed the desired product may be isolated from the reaction mixture and purified by conventional procedures. The products are generally of low solubility in organic solvents and may be readily recovered by filtration and purified by washing with ether and water. Alternatively, a solvent such as ether or water, in which the product is insoluble, may be added to the reaction mixture to insure complete precipitation of the product.

It has been found that this reaction can be effected by the use of any compounds which possess sulfhydryl such as those mentioned above.

The 6-pteridylmethylene imines used in this invention as starting materials are conveniently prepared according to methods available in the art. The 2-acylamino-6-pteridylmethylene imines, however, are the co-invention of M. Sletzinger and M. Tishler and methods for the preparation of such compounds are disclosed in the application Serial No. 334,382, now abandoned, and in the co-pending application Serial No. 427,333. Examples of some such imines which may be used in this process that might be mentioned are N-{p[(2-acetamido-4-hydroxy-6-pteridylmethylene) imino] benzoyl {glutamic acid, N-{p-[(2-benzamido-4-hydroxy-6-pteridyl methylene) imino] benzoyl glutamic acid, N-{p-[(2-butyramido-4-benzyloxy-6-pteridylmethylene) imino] benzoyl} glutamic acid, N-{p-[(2-acetamido-4-hydroxy-6-pteridylmethylene) imino] benzoic acid and esters thereof such as the methyl, ethyl, phenyl, and benzyl esters, N-{p-[(2-amino-4-hydroxy-6-pteridylmethylene) imino] benzamide and N-{p[(2-amino - 4 - hydroxy - 6 - pteridylmethylene) imino] benzoylaspartic acid.

The 2-acylamino-6-pteridylmethylene imines are preferably used in this process because they are much more soluble than the corresponding 2-amino compounds and give greater yields of the desired products in a much shorter reaction time. In addition, the 2-acylamino compounds are more readily purified than the non-acylated compounds.

In a specific embodiment of this process N-{p-[(2-acetamido-4-hydroxy-6-pteridylmethylene) imino] benzoyl} glutamic acid is reacted with a sulfhydryl compound such as p-thiocresol to form 2-acetamido pteroylglutamic acid, also called $N^2$ acetyl folic acid. Likewise, N-p[(2-amino-4-hydroxy - 6 - pteridylmethylene) imino] benzoic acid is reduced according to this invention to pteroic acid. Similarly, other imines such as those hereinabove specifically named may be reduced with sulfhydryl compounds to the corresponding 6-pteridylmethylene amines.

Example 1

A mixtures of 1.34 g. of 2-acetamido-4-hydroxy-6-formyl pteridine, 2.0 g. of p-aminobenzoylglutamic acid, 5.0 g. of p-thiocresol and 50 ml. of methylcellosolve is heated at reflux temperature for 3½ hours. The dark red reaction mixture is cooled to room temperature and added to 250 ml. of absolute ether with stirring. After stirring for 10 minutes the $N^2$ acetyl pteroylglutamic acid is filtered, washed thoroughly with ether and dried under reduced pressure at room temperature. The product so obtained assays 65.5% folic acid by the Bratton-Marshall chemical assay and 64% folic acid by the bioassay using L. casei as test organism.

Esters of $N^2$ acetyl pteroylglutamic acid are obtained by utilizing esters, such as the ethyl, propyl and benzyl esters of p-aminobenzoylglutamic acid as reactants.

Example 2

A mixture of 1.6 g. of 2-acetamido-4-hydroxy-6-formyl pteridine, 2.0 g. of p-aminobenzoylglutamic acid, 1.8 g. of thiourea and 50 ml. of Cellosolve is refluxed for 3 hours. The mixture is cooled to room temperature and added to 250 ml. of absolute ether with stirring. The brown precipitate of $N^2$ acetyl pteroylglutamic acid is filtered, washed with ether and dried. Without further purification it assays 20.4% folic acid by chemical assay.

This process is repeated using thioacetic acid, β-thionaphthol, benzylmercaptan, t-butylmercaptan, and hydrogen sulfide in place of thiourea to produce $N^2$ acetyl pteroylglutamic acid.

Example 3

A mixture of 1.31 g. of 2-amino-4-hydroxy-6-formyl pteridine, 2.1 g. of p-aminobenzoylglutamic acid, 2.5 g. of thiocresol and 50 ml. of Cellosolve is heated at reflux for 13 hours. The mixture is cooled to room temperature and filtered to remove unreacted 2-amino-4-hydroxy-6-formyl pteridine. The filtrate is diluted with absolute ether to yield a red-yellow precipitate of pteroylglutamic acid which is removed by filtration, washed with ether and dried at room temperature under reduced pressure. It analyzes 37% folic acid by chemical assay and 46% folic acid by microbial assay.

Pteroylglutamic acid is also produced in this manner using other sulfhydryl compounds such as thiophenol, thioglycolic acid, thiourea and β-thionaphthol and solvents such as dioxane tetrahydropyran, pyridine and acetic acid.

Example 4

A mixture of 0.5 g. of 2-acetylamino-4-hydroxy-6-formyl pteridine, 0.7 g. of p-aminobenzoylaspartic acid and 1 g. of benzylmercaptan are refluxed in 50 ml. of pyridine for 10 hours. The mixture is cooled, ether is added and the product consisting of $N^2$ acetyl pteroylaspartic acid is recovered by filtration.

In the same manner other amides of p-aminobenzoic acid with amines such as glycine, alanine, leucine and cysteine may be reacted with 2-acetylamino-4-hydroxy-6-formyl pteridine to produce the corresponding derivatives of $N^2$ acetyl pteroic acid.

Example 5

A mixture of 1 g. of p-aminobenzamide, 1.2 g. of 2-acetylamino-4-hydroxy-6-formyl pteridine and 2 g. of thiourea is refluxed in 150 ml. of dioxane for 12 hours. After cooling ether is added to the mixture and the $N^2$ acetyl pteramide recovered by filtration.

Example 6

A mixture of 0.7 g. of ethyl p-aminobenzoate, 1.0 g. of 2-amino-4-hydroxy-6-formyl pteridine and 1.5 g. of thiocresol is refluxed in Cellosolve for 15 hours, cooled, ether added and the ethyl pteroate recovered by filtration.

This reaction is repeated with other esters of p-amino- benzoic acid such as the methyl, propyl, phenyl, and benzyl to produce the corresponding esters of pteroic acid.

Example 7

A mixture of 1 g. of 2-acetylamino-4-hydroxy-6-formyl pteridine, 0.6 g. of p-aminobenzoic acid and 1.4 g. of β-thionaphthol are added to 100 ml. of pyridine and refluxed for 14 hours. The mixture is cooled and ether added to precipitate $N^2$ acetyl pteroic acid. The product is filtered and dried.

Example 8

To a 500 ml. three-necked flask equipped with stirrer, condenser, nitrogen inlet and thermometer are added 6.7 g. of 2-acetamido-4-hydroxy-6-formyl pteridine, 10 g. of p-aminobenzoyl glutamic acid, 25 g. of p-thiocresol and 250 ml. of methyl Cellosolve. The flask is flushed with nitrogen and the mixture is heated rapidly to the reflux temperature with stirring. The solution is refluxed under nitrogen for 3½ hours during which time the color changes from yellow to orange to a dark reddish brown. A gelatinous precipitate forms during this period and the viscosity of the mixture increases.

After completion of the refluxing, the reaction mixture is poured into 3500 ml. of rapidly stirred hot water. The reaction flask is rinsed with 200 ml. of hot water which is added to the batch. The resultant mixture is heated at 100° C. with stirring until removal of thiocresol is complete. This requires about 1¼ hours. 500 ml. of distillate is obtained consisting of a mixture of thiocresol and water.

The undistilled residue remaining after distillation is filtered while hot and the dark colored filtrate is allowed to cool slowly to room temperature. The mixture is then chilled in an ice bath and filtered. The solid $N^2$ acetyl folic acid thus obtained is washed with acetone and ether and dried at 80° C. It weighed 7.5 g. and assayed as 92% acetyl folic acid by the Bratton-Marshall method.

The $N_2$ acetyl folic acid is readily converted to folic acid itself by treatment with a 0.1 N solution of sodium hydroxide at 90° C. for 30 minutes. The folic acid obtained after decolorization with charcoal and acidification to pH 3 with hydrochloric acid is essentially pure.

Example 9

A mixture of 2.0 g. of N-{p[(2-acetamido-4-hydroxy-6-pteridylmethylene) imino] benzoyl} glutamic acid, 1.84 g. of thioglycollic acid and 50 ml. of Cellosolve is refluxed for 6 hours. The green-black mixture is allowed to stand overnight at room temperature and is then added with stirring to 250 ml. of absolute ether. The $N^2$ acetyl folic acid is removed by filtration, washed with ether and dried at room temperature under diminished pressure.

The N-{p[(2-acetamido-4-hydroxy-6-pteridyl-methylene) imino] benzoyl} glutamic acid used in this example is conveniently produced according to methods disclosed in Serial No. 334,382.

Example 10

A mixture of 2.0 g. of N-{p[(2-acetamido-4-hydroxy-6-pteridylmethylene) imino] benzoyl} glutamic acid, 2.0 ml. of thiophenol and 50 ml. of methyl Cellosolve is heated under reflux for 4 hours. The mixture is cooled to room temperature and added to 250 ml. of absolute ether with stirring. After stirring for several minutes the red-brown precipitate is removed by filtration. The $N^2$ acetyl folic acid is then washed with ether and dried under diminished pressure. It assays 35% folic acid by chemical assay and 46% folic acid by microbial assay using L. casei.

Example 11

A mixture of 2.0 g. of N-{p[(2-acetamido-4-hydroxy-6-pteridylmethylene) imino] benzoyl} glutamic acid, 1.84 g. of thioglycolic acid and 50 ml. of Cellosolve is refluxed 6 hours. The mixture is allowed to stand overnight at room temperature and is then added to 250 ml. of absolute ether with stirring. The $N^2$ acetyl folic acid precipitates and is filtered, washed with ether and dried under reduced pressure at room temperature.

Example 12

About 0.5 g. of N-p[(2-amino-4-hydroxy-6-pteridyl-methylene) imino] benzoic acid and 1 g. of thiourea are added to 300 ml. of dioxane and heated at reflux for 10 hours. The mixture is cooled and allowed to stand overnight. The pteroic acid is recovered by filtration and is washed with ether and dried.

This reaction may be repeated with the ethyl ester of this imine to form ethyl pteroate.

Example 13

To 250 ml. of ethylene glycol is added 0.75 g. of N-p[(2-amino-4-hydroxy-6-pteridylmethylene) imino] benzamide and 1.5 g. of benzylmercaptan. The mixture is refluxed for 8 hours, cooled and pteramide recovered by filtration. It is washed with ether and dried.

Example 14

To 300 ml. of Cellosolve is added 1 g. of N-{p[(2-acetamido-4-hydroxy-6-pteridylmethylene) imino] benzoyl} aspartic acid and 1.25 g. of thiocresol. The mixture is refluxed for 5 hours, cooled and the $N^2$ acetyl pteroylaspartic acid recovered by filtration. It is washed with ether and dried.

Example 15

A mixture of 2.0 g. of N-{p[(2-acetamido-4-hydroxy-6-pteridylmethylene) imino] benzoyl} glutamic acid, 2 g. of thiocresol and 50 ml. of Cellosolve is refluxed for about 4 hours. After refluxing, the mixture is poured into 1000 ml. of stirred hot water. The aqueous mixture is then heated at 100° C. for about one-half hour to distill the thiocresol mixed with water. About 200 ml. of distillate is collected during the removal of the thiocresol. The undistilled residue is filtered while hot and then cooled to room temperature. After chilling in an ice bath the $N^2$ acetyl folic acid is isolated by filtration, washed with acetone and ether and dried.

Various changes and modifications of the invention can be made and, to the extent that such variations incorporate the spirit of this invention, they are intended to be included within the scope of the appended claims.

We claim:

1. The process which comprises reacting a member from the group consisting of 2-acylamino-4-hydroxy-6-formyl pteridines wherein the acyl group is the radical of a carboxylic acid having not more than eight carbon atoms, and 2-amino-4-hydroxy-6-formyl pteridine with a member from the group consisting of p-amino benzoic acid, p-aminobenzoic acid esters, p-aminobenzamide, p-aminobenzoylglutamic acid and p-aminobenzoylaspartic acid in the presence of a compound having a sulfhydryl group to produce the corresponding pteridylmethylene amine.

2. The process which comprises reacting 2-acetamido-4-hydroxy-6-formyl pteridine with p-aminobenzoylglutamic acid in the presence of a compound having a sulfhydryl group to form $N^2$ acetyl pteroylglutamic acid.

3. The process of claim 2 in which the sulfhydryl compound is thiocresol.

4. The process which comprises reacting 2-amino-4-hydroxy-6-formyl pteridine with p-aminobenzoylglutamic acid in the presence of a compound having a sulfhydryl group to form pteroylglutamic acid.

5. The process of claim 4 in which the sulfhydryl compound is thiocresol.

6. The process which comprises reacting 2-acetamido-4-hydroxyl-6-formyl pteridine with p-aminobenzoic acid in the presence of a compound having a sulfhydryl group to form $N^2$ acetyl pteroic acid.

7. The process which comprises reacting 2-acetamido-4-hydroxy-6-formyl pteridine with an ester of p-aminobenzoic acid in the presence of a compound having a sulfhydryl group to form the corresponding ester of $N^2$ acetyl pteroic acid.

8. The process which comprises reacting 2-acetamido-4-hydroxy-6-formyl pteridine with ethyl-p-aminobenzoate in the presence of a compound having a sulfhydryl group to form ethyl $N^2$ acetyl pteroate.

9. The process which comprises reacting 2-acetamido-4-hydroxy-6-formyl pteridine with p-aminobenzoylaspartic acid in the presence of a compound having a sulfhydryl group to form $N^2$ acetyl pteroylaspartic acid.

10. The process which comprises reacting a compound of the formula

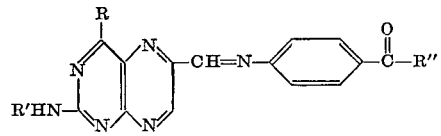

wherein R is hydroxy, R' is a member of the group consisting of hydrogen and acyl groups of carboxylic acids having not more than 8 carbon atoms and R'' is a member of the group consisting of hydroxy, amino aspartyl and glutamyl groups, with a compound possessing a sulfhydryl group to produce a compound of the formula

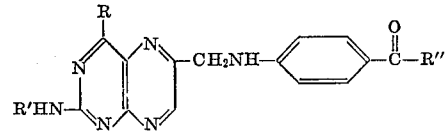

wherein R, R' and R'' have the significance defined above.

11. The process which comprises reacting N-{p[(2-acetamido - 4 - hydroxy-6-pteridylmethylene) imino] benzoyl} glutamic acid with a compound possessing a sulfhydryl group to produce $N^2$-acetyl folic acid.

12. The process according to claim 11 in which the sulfhydryl compound is thiophenol.

13. The process according to claim 11 in which the sulfhydryl compound is thiocresol.

14. The process which comprises reacting N-{p[(2-amino-4-hydroxy-6-pteridylmethylene) imino] benzoyl} glutamic acid with a compound possessing a sulfhydryl group to produce folic acid.

15. The process which comprises reacting N-p[2-acetamido-4-hydroxy-6-pteridylmethylene) imino] benzoic acid with a compound possessing a sulfhydryl group to produce $R^2$ acetyl pteroic acid.

16. The process which comprises reacting N-p[(2-amino-4-hydroxy-6-pteridylmethylene) imino] benzamide with a compound possessing a sulfhydryl group to produce pteramide.

17. The process which comprises reacting N-p[(2-amino-4-hydroxy-6-pteridylmethylene) imino] benzoic acid with a compound possessing a sulfhydryl group to produce pteroic acid.

18. The process which comprises reacting N-{p[(2-acetamido-4-hydroxy-6-pteridylmethylene) imino] benzoyl} aspartic acid with a compound possessing a sulfhydryl group to produce $N^2$-acetylpteroylaspartic acid.

No references cited.